(12) United States Patent
Lee

(10) Patent No.: US 7,082,341 B2
(45) Date of Patent: Jul. 25, 2006

(54) HOME NETWORK SYSTEM AND METHOD FOR EXCHANGING STANDARDS IN THE SAME

(75) Inventor: Koon Seok Lee, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 10/475,333

(22) PCT Filed: Apr. 10, 2002

(86) PCT No.: PCT/KR02/00655

§ 371 (c)(1),
(2), (4) Date: Oct. 21, 2003

(87) PCT Pub. No.: WO03/073692

PCT Pub. Date: Sep. 4, 2003

(65) Prior Publication Data

US 2004/0117068 A1   Jun. 17, 2004

(30) Foreign Application Priority Data

Feb. 28, 2002   (KR) ............................... 2002-10935

(51) Int. Cl.
*G06F 17/00* (2006.01)
(52) U.S. Cl. ............................. 700/90; 700/3
(58) Field of Classification Search ............... 700/3, 700/90, 275, 257; 340/3.21, 3.43; 710/305; 370/465
See application file for complete search history.

(56) References Cited

U.S. PATENT DOCUMENTS

| 6,121,593 | A | 9/2000 | Mansbery et al. |
| 6,615,088 | B1* | 9/2003 | Myer et al. ................. 700/20 |
| 6,865,428 | B1* | 3/2005 | Gonzales et al. ............. 700/86 |
| 2001/0025349 | A1* | 9/2001 | Sharood et al. ............. 713/340 |
| 2002/0097851 | A1* | 7/2002 | Daum et al. ........... 379/102.03 |
| 2003/0107476 | A1* | 6/2003 | Sahinoglu et al. ..... 340/310.01 |
| 2003/0109938 | A1* | 6/2003 | Daum et al. .................. 700/11 |
| 2004/0158333 | A1* | 8/2004 | Ha et al. ........................ 700/3 |

FOREIGN PATENT DOCUMENTS

| EP | 1058422 A1 * | 12/2000 |
| EP | 1063829 A2 * | 12/2000 |
| JP | 11-187061 | 7/1999 |
| JP | 2001-350676 | 12/2001 |
| KR | 10-2001-0037660 | 5/2001 |
| KR | 10-0357045 | 9/2001 |
| KR | 2001-0085803 | 9/2001 |
| WO | WO 03/049374 A1 | 12/2001 |
| WO | WO 02/049276 A3 | 1/2003 |

* cited by examiner

*Primary Examiner*—Leo Picard
*Assistant Examiner*—Alexander Kosowski
(74) *Attorney, Agent, or Firm*—McKenna Long & Aldridge LLP

(57) ABSTRACT

A home network system and a method for exchanging standards of the same are disclosed. The home network system includes a first electric home appliance group operated as a first operation system; a second electric home appliance group operated as a second operation system; and an exchanging part for exchanging standards between the first electric home appliance group and the second electric home appliance group so as to control appliances of the second electric home appliance group in the first electric home appliance group or to monitor an operational state of the second electric home appliance group in the first electric home appliance.

8 Claims, 4 Drawing Sheets

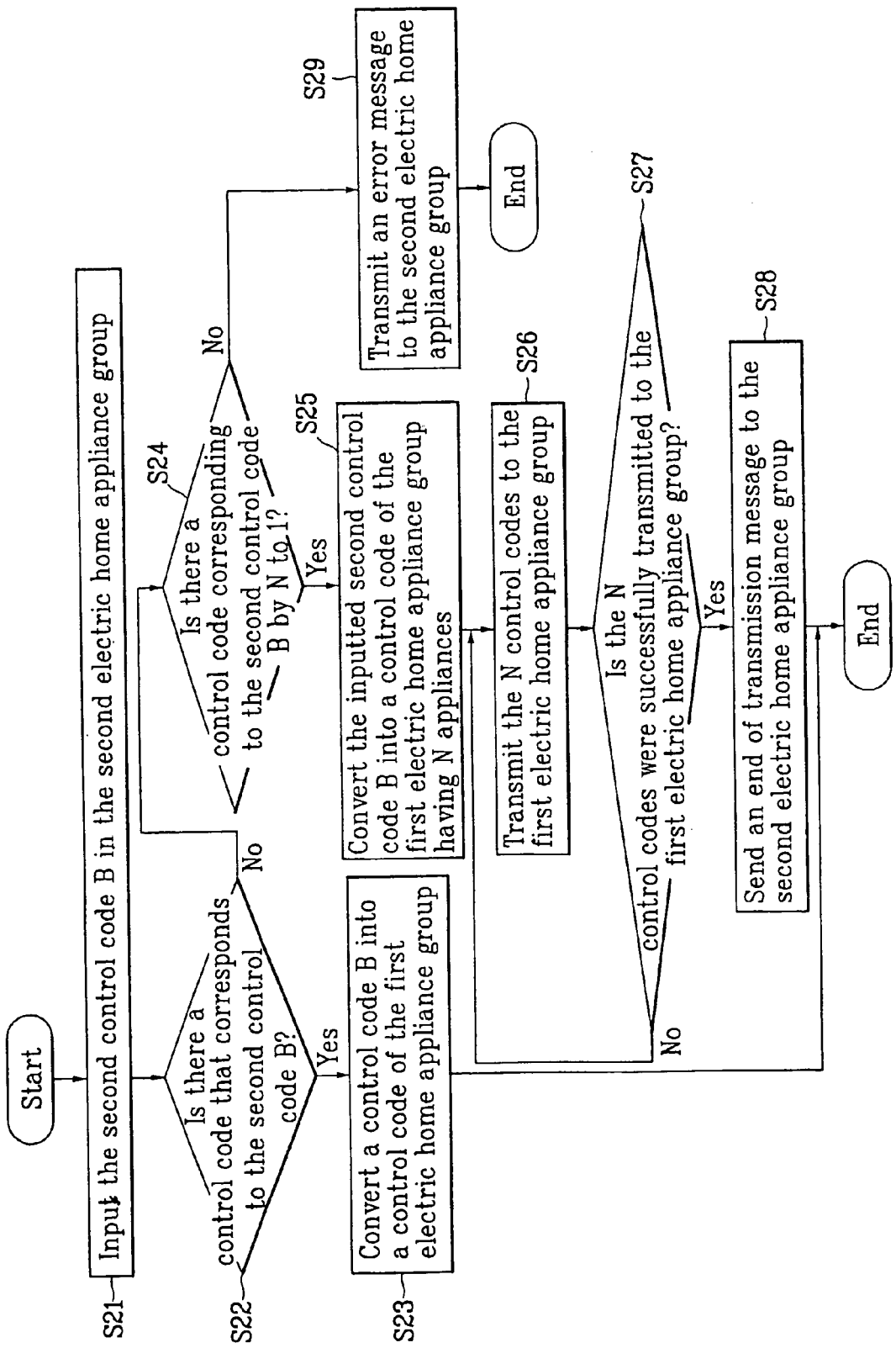

HOME NETWORK SYSTEM AND METHOD FOR EXCHANGING STANDARDS IN THE SAME

TECHNICAL FIELD

The present invention relates to a home network system, more particularly, to a home network system and a method for exchanging standards of different network systems.

BACKGROUND ART

Although 'Home Automation' first started to automatically control home appliances from somewhere in the house or from a remote place, the appliances were not connected to each other, and one had to deal with each appliance individually by using telephone or infrared rays. Recently however, all electronic apparatuses are networked together with help of a communication means, and a home network system for integrative control on the network through a controller is going to be available to the public in no time.

FIG. 1 is a diagram illustrating a configuration of the home network system.

As depicted in FIG. 1, the home network system includes a communication bus for interconnecting a plurality of home appliances, such as, refrigerator, washing machine, personal computer (PC), etc.

Particularly, FIG. 2 illustrates a case in which every apparatus' micom has a serial communication function and is directly connected to the communication bus. FIG. 3, on the other hand, illustrates a case in which the micom does not have the serial communication function. In such case, a separate communication module is needed to configure the home network.

The home network generally includes a controller for controlling network system. However, now that almost every house has a personal computer, one can simply install an application program for controlling the network system into the personal computer and use that as network controller.

Even though many homes are already using the home network system now, a lot more work needs to be done on the technologies associated with the controller for displaying a menu screen in order to realize more efficient, simple control of the home network system.

In summary, the conventional home network system has the following problems.

First, home networking among electric home appliances with different standards is not possible since there are a variety of communication standards for configuring a home network.

Second, because Windows XP supports UPnP as operation system, users can set up a home network only with appliances that support UPnP. However, this does not apply to appliances that use 8-bit micom in general.

DISCLOSURE OF INVENTION

It is, therefore, an object of the present invention to provide a home network system and a method for exchanging standards in the same, thereby enabling an exchange of diverse communication standards for configuring a home network.

To achieve the above object, there is provided the home network system, which includes a first electric home appliance group operated as a first operation system; a second electric home appliance group operated as a second operation system; and an exchanging unit for exchanging standards between the first electric home appliance group and the second electric home appliance group so as to control appliances of the second electric home appliance group in the first electric home group or to monitor an operational state of the second electric home appliance group in the first electric home appliance group.

Another aspect of the present invention provides the method for exchanging standards of the home network system with the first and second electric home appliance groups, the method including the steps of: inputting a first control code A that is designated from the first electric home appliance group in the second electric home appliance group; deciding if the second electric home appliance group has only a single control code corresponding to the first control code A inputted; if the second electric home appliance group has only a single control code corresponding to the first control code A inputted, converting the first control code A to a control code for a corresponding appliance among the second electric home appliances and then controlling the appliance; and if controlling the appliance is completed, transmitting an end of control message to the first electric home appliance group.

If it turns out that there is not only one single control code corresponding to the first control code A inputted, the method further comprising the steps of: deciding if the second electric home appliance group has a plurality of control codes corresponding to the first control code inputted; if the second electric home appliance group has a plurality of control codes corresponding to the first control code inputted, monitoring a state of a corresponding appliance; creating a control code of the second electric home appliance group by utilizing the first control code A inputted and monitored data; controlling a plurality of appliances belonging to the second electric home appliance group by using the control code created; and if controlling of the appliances is completed, transmitting an end of control message to the first electric home appliance group.

If the second electric home appliance group does not have a plurality of control codes corresponding to the first control code A inputted, the method further comprises the step of transmitting an error message to the first electric home appliance group.

The method for exchanging standards of the home network system according to the present invention also works when, on the contrary to the above, a second control code B having been designated from the second electric home appliance group is inputted in the first electric home appliance group so as to control appliances of the first electric home appliance group in the second electric home appliance group.

BRIEF DESCRIPTION OF DRAWINGS

The above objects, features and advantages of the present invention will become more apparent from the following detailed description when taken in conjunction with the accompanying drawings, in which:

FIGS. 5 and 6 are flow charts explaining how to exchange communication standards of the home network systems according to the present invention.

BEST MODE FOR CARRYING OUT THE INVENTION

A preferred embodiment of the present invention will now be described with reference to the accompanying drawings.

Figure 1:
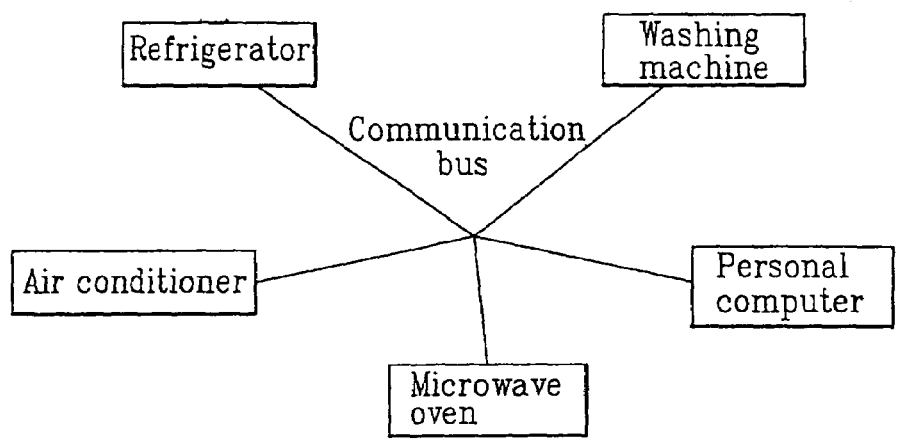
FIG. 1 is a block diagram illustrating a general home network system.
Figure 2:
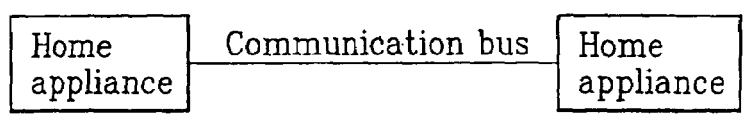
FIG. 2 is a block diagram illustrating how to connect a communication bus using a serial communication function.
Figure 3:
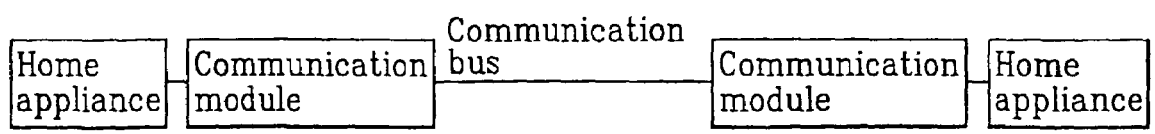
FIG. 3 is a block diagram representing a method for connecting a communication bus by using a separate communication module.
Figure 4:
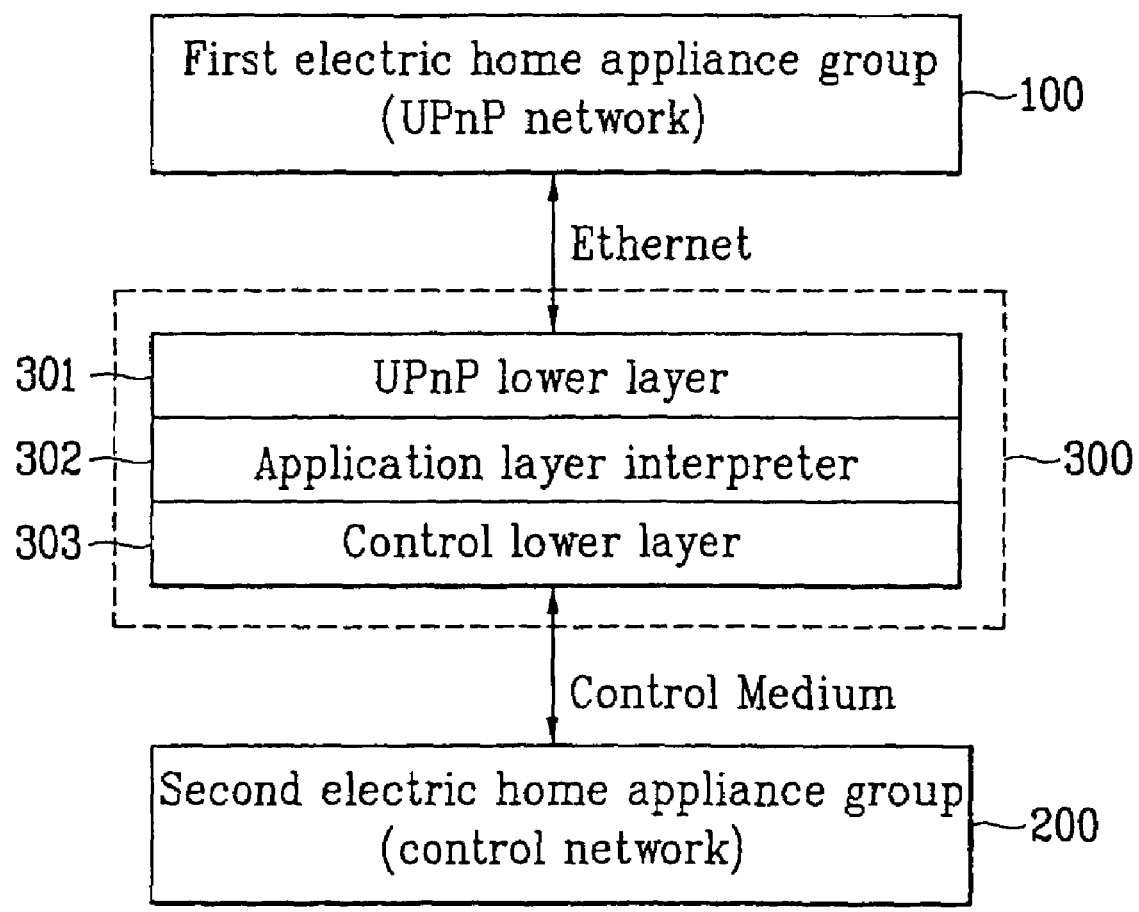
FIG. 4 is a bloc diagram depicting the structure of a home network system's standard exchanging apparatus according to the present invention.
Figure 5:
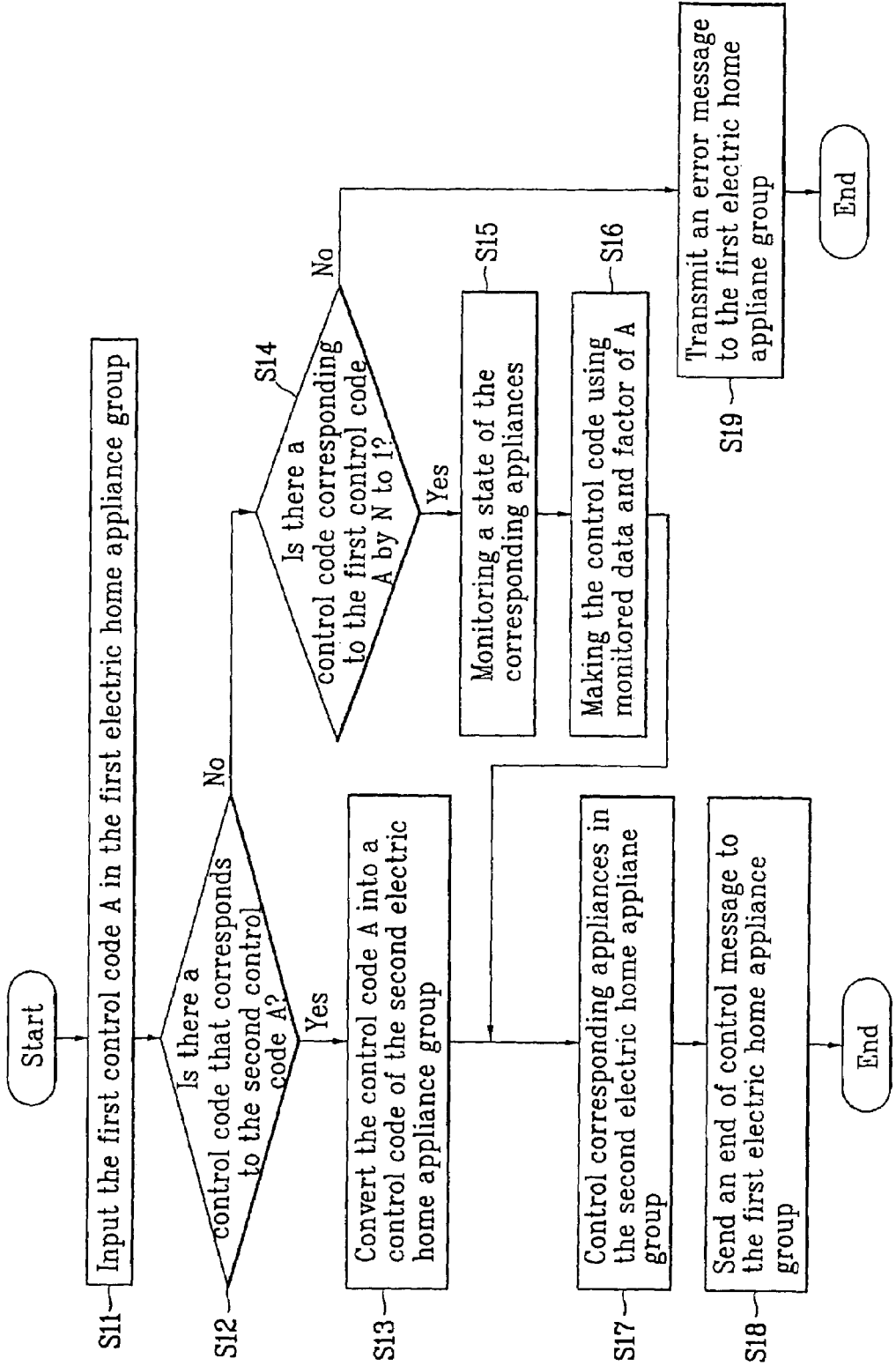

FIG. 4 is a bloc diagram depicting the structure of a home network system's standard exchanging apparatus according to the present invention, and FIGS. 5 and 6 are flow charts explaining how to exchange communication standards of the home network systems according to the present invention.

As shown in FIG. 4, the home network system's standard exchanging apparatus embodying the principles of the present invention includes a first electric home appliance group 100 operated as a first operation system; a second electric home appliance group 200 operated as a second operation system; and an exchanging unit 300 for exchanging standards between the first electric home appliance group 100 and the second electric home appliance group 200 so as to control appliances of the second electric home appliance group 200 in the first electric home group 100 or to monitor an operational state of the second electric home appliance group 200 in the first electric home appliance group 100.

Exchanging unit 300 includes a lower layer 301 of the first electric home appliance group 100, a lower layer 303 of the second electric home appliance group 200, and an application layer interpreter 302 for interpreting between each lower layer 301, 302 and an application layer.

Here, the first operation system is a Windows XP. Because Windows XP supports UPnP (Universal Plug and Play) as operation system (OS), users can easily compose the first electric home appliance group with electric appliances that support UPnP, without knowing any specific technologies.

In general, the first electric home appliance group consists of PC, DTV, A/V etc.

Meanwhile, the second operation system usually uses an 8-bit micom to which UPnP cannot be applied, so the second electric home appliance group naturally includes electric appliances that mostly use the 8-bit micom.

In general, the second electric home appliance group consists of refrigerator, air conditioner, lamp, microwave etc.

That is, UPnP is not supported by the electric appliances that usually use the 8-bit micom, but a particular networking standard using a resource with little capacity should be applied to those appliances.

In short, there is the first electric home appliance group 100 that supports UPnP, and the second electric home appliance group 200 that does not support UPnP. What needs to be done so as to control or monitor the appliances of the second electric home appliance group 200 in the first electric home appliance group 100 is to exchange standards between the first electric home appliance group 100 and the second electric home appliance group 200. And, this work is done by exchanging unit 300.

Therefore, the method for exchanging standards of the home network system according to the present invention can be divided largely into two methods: one is controlling appliances of the second electric home appliance group 200 that does not support UPnP in the first electric home appliance group 100 that supports UPnP, and the other is monitoring operational states of appliances of the second electric home appliance group 200 that does not support UPnP in the first electric home appliance group 100 that supports UPnP.

First of all, the method for controlling appliances of the second electric home appliance group 200 that does not support UPnP in the first electric home appliance group 100 that supports UPnP is explained with reference to FIG. 5. At first, a user inputs the first control code A having been designated by the first electric home appliance group 100 (S11).

Then, it is decided whether the second electric appliance group includes a control code that corresponds to the first control code A inputted by one to one (S12).

At a result of decision (S12), if there exists a control code that corresponds to the first control code A inputted by one to one in the second electric home appliance group, the first control code A is converted to a control code of the second electric home appliance group (S13).

However, if the second electric home appliance group does not have a control code corresponding to the first control code A by one to one, it is decided whether there is a control code corresponding to the first control code by N to 1 instead (S14).

At step 14, if it turns out that there is a control code corresponding to the first control code A by N to 1 in the second electric home appliance group, a corresponding appliance's state is monitored (S15).

Based on the first control code A factor and the monitored data, a control code for controlling appliances in the second electric home appliance group is created (S16).

Using the control code that has been converted at step 13 and the control code that has been created at step 16, the appliances in the second electric home appliance group are controlled (S17).

When controlling the appliances is complete, an end of control message is sent to the first electric home appliance group (S18).

On the other hand, if it turns out that there is no control code corresponding to the first control code A by N to 1 in the second electric home appliance group, an error message is transmitted to the first electric home appliance group (S19).

Therefore, the method for exchanging standards of the home network system according to the present invention results smoother networking between appliances that support UPnP and appliances that do not support UPnP but uses a low-level controller.

FIG. 6 illustrates the method for monitoring operational a state of the second electric home appliance group that does not support UPnP in the first electric home appliance group that supports UPnP. First of all, the user inputs the second control code B having been pre-designated by the second electric home appliance group 200 (211).

Then, it is decided whether the first electric appliance group has a control code that corresponds to the second control code B inputted by one to one (S22).

At a result of decision (S22), if there exists a control code that corresponds to the second control code B inputted by one to one in the first electric home appliance group, the second control code B is converted to a control code of the first electric home appliance group that supports UPnP (S23).

However, if the first electric home appliance group does not have a control code corresponding to the second control code B by one to one, it is decided whether there is a control code corresponding to the second control code B by N to 1 instead (S24).

At step 24, if it turns out that there is a control code corresponding to the second control code B by N to 1 in the first electric home appliance group, the inputted second control code B is converted control codes of the first electric home appliance group having N appliances (S25).

And, the converted N control codes are transmitted to the first electric home appliance group (S26).

Later, it is found out whether N control codes have been successfully transmitted to the first electric home appliance group (S27).

When transmission is complete, an end of transmission message is sent to the second electric home appliance group (S28).

On the other hand, if it turns out that there is no control code corresponding to the second control code B by N to 1 in the first electric home appliance group, an error message is transmitted to the second electric home appliance group (S29).

In conclusion, the apparatus and method for exchanging standards of home network systems according to the present invention first divides electric home appliances into the first electric home appliance group that supports UPnP and the second electric home appliance group that does not support UPnP, and exchanges standards of the first and second electric home appliance groups, thereby controlling or monitoring appliances of the second electric home appliance group in the first electric home appliance group.

While the invention has been shown and described with reference to certain preferred embodiments thereof, it will be understood by those skilled in the art that various changes in form and details may be made therein without departing from the spirit and scope of the invention as defined by the appended claims.

INDUSTRIAL APPLICABILITY

The home network system and the method for exchanging standards of the same according to the present invention can be advantageously used for configuring a home network with appliances having different standards. This can be done by exchanging standards of an electric home appliance group that is operated by Windows XP supported by UPnP and a general electric home appliance group that uses a low-level controller like an 8-bit micom through an exchanging unit.

What is claimed is:

1. A home network system, comprising: a first electric home appliance group operated as a first operation system; a second electric home appliance group operated as a second operation system; and an exchanging unit for exchanging standards between the first electric home appliance group and the second electric home appliance group so as to control appliances of the second electric home appliance group in the first electric home group or to monitor an operational state of the second electric home appliance group in the first electric home appliance group, wherein the exchanging unit comprises: a first lower layer of the first electric home appliance group; a second lower layer of the second electric home appliance group; and an application layer interpreter for interpreting between each of the lower layers and an application layer.

2. The home network system according to claim 1, wherein the first operation system is Windows XP supported by UPnP (Universal Plug and Play), and the second operation system is an operation system using an 8-bit micom that does not support UPnP.

3. A method for exchanging standards of a home network system having a first and second electric home appliance groups based on different operation system, the method comprising the steps of:
inputting a first control code A that is designated from the first electric home appliance group in the second electric home appliance group;
deciding if the second electric home appliance group has only a single control code corresponding to the first control code A inputted;
if the second electric home appliance group has only a single control code corresponding to the first control code A inputted, converting the first control code A to a control code for a corresponding appliance among the second electric home appliances and then controlling the appliance; and
if the controlling of the appliance is completed, transmitting an end of control message to the first electric home appliance group.

4. The method according to claim 3, further comprising the steps of:
if more than one control code corresponding to the first control code A inputted exists, redeciding if the second electric home appliance group has a plurality of control codes corresponding to the first control code A inputted;
if the second electric home appliance group has a plurality of control codes corresponding to the first control code A inputted, monitoring a state of a corresponding appliance;
creating a control code of the second electric home appliance group by utilizing the first control code A factor inputted and the monitored data;
controlling a plurality of appliances belonging to the second electric home appliance group by using the control code created; and
if the controlling of the appliances is completed, transmitting an end of control message to the first electric home appliance group.

5. The method according to claim 4, further comprising the step of transmitting an error message to the first electric home appliance group, if the second electric home appliance group does not have a plurality of control codes corresponding to the first control code A inputted.

6. A method for exchanging standards of a home network system having a first electric home appliance group and a second electric home appliance group based on different operation systems, the method comprising the steps of:
inputting a second control code B that is pre-designated from the second electric home appliance group in the first electric home appliance group;
deciding if the first electric home appliance group has only a single control code corresponding to the second control code B inputted;
if the first electric home appliance group has only a single control code corresponding to the second control code B inputted, converting the second control code B to a control code for a corresponding appliance among the first electric home appliances and then controlling the appliance; and
if controlling the appliance is completed, transmitting an end of control message to the second electric home appliance group.

7. The method according to claim 6, further comprising the steps of:
- if more than one control code corresponding to the second control code B inputted exists, redeciding if the first electric home appliance group has a plurality of control codes corresponding to the second control code B inputted;
- if the first electric home appliance group has a plurality of control codes corresponding to the second control code B inputted, monitoring a state of a corresponding appliance;
- creating a control code of the first electric home appliance group by utilizing the second control code B factor inputted and the monitored data;
- controlling the plurality of appliances belonging to the first electric home appliance group by using the control code created; and
- if the controlling of the appliances is completed, transmitting an end of control message to the second electric home appliance group.

8. The method according to claim 7, further comprising the step of transmitting an error message to the second electric home appliance group, if the first electric home appliance group does not have a plurality of control codes corresponding to the second control code B inputted.

* * * * *